No. 793,492. PATENTED JUNE 27, 1905.
O. C. WYSONG.
MORTISING MACHINE.
APPLICATION FILED JUNE 18, 1904.
5 SHEETS—SHEET 1.

WITNESSES:
Jos. A. Ryan
Amos W. Hart

INVENTOR
Olmedo C. Wysong
BY Munn & Co.
ATTORNEYS

No. 793,492. PATENTED JUNE 27, 1905.
O. C. WYSONG.
MORTISING MACHINE.
APPLICATION FILED JUNE 18, 1904.
5 SHEETS—SHEET 3.
Fig. 3.
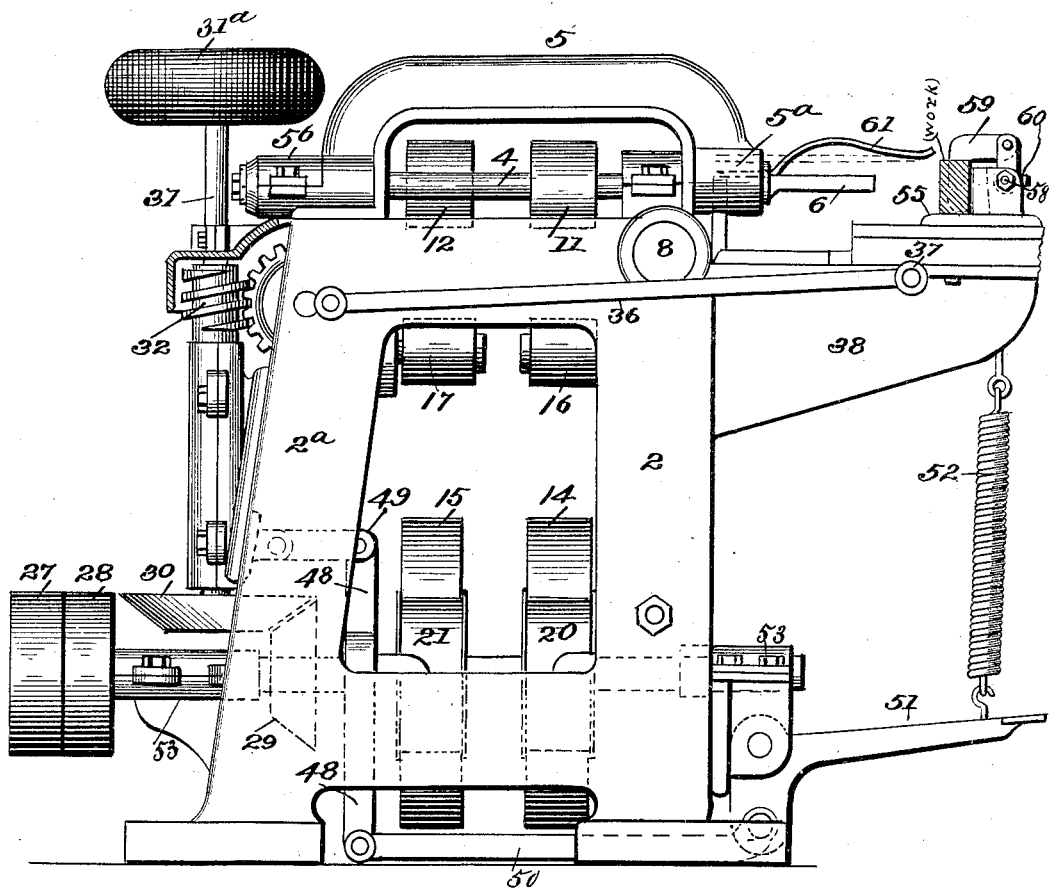
Fig. 3.ᵃ
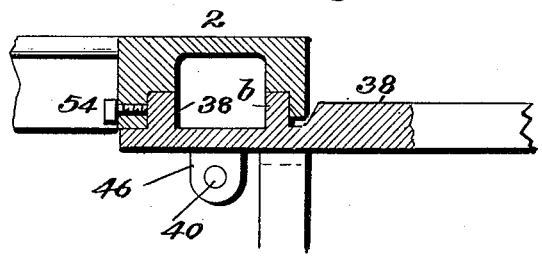
WITNESSES:
Jos. A. Ryan
Amos W Hart
INVENTOR
Olmedo C. Wysong.
BY Munn & Co.
ATTORNEYS No. 793,492. PATENTED JUNE 27, 1905.
O. C. WYSONG.
MORTISING MACHINE.
APPLICATION FILED JUNE 18, 1904.

5 SHEETS—SHEET 4.

WITNESSES:
Jos. A. Ryan
Amos W Hart

INVENTOR
Olmedo C. Wysong.
BY Munn&Co.
ATTORNEYS

No. 793,492. PATENTED JUNE 27, 1905.
O. C. WYSONG.
MORTISING MACHINE.
APPLICATION FILED JUNE 18, 1904.
5 SHEETS—SHEET 5.
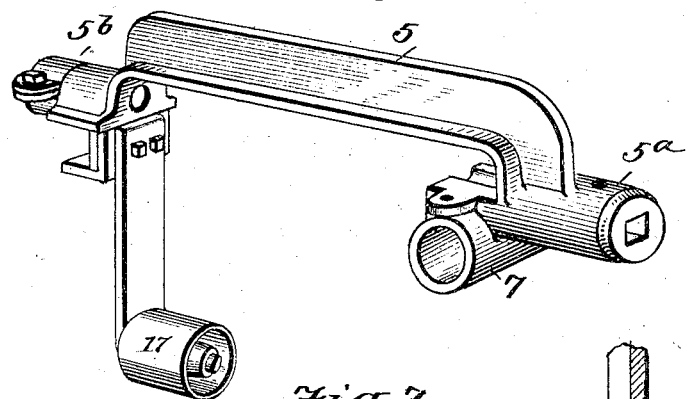
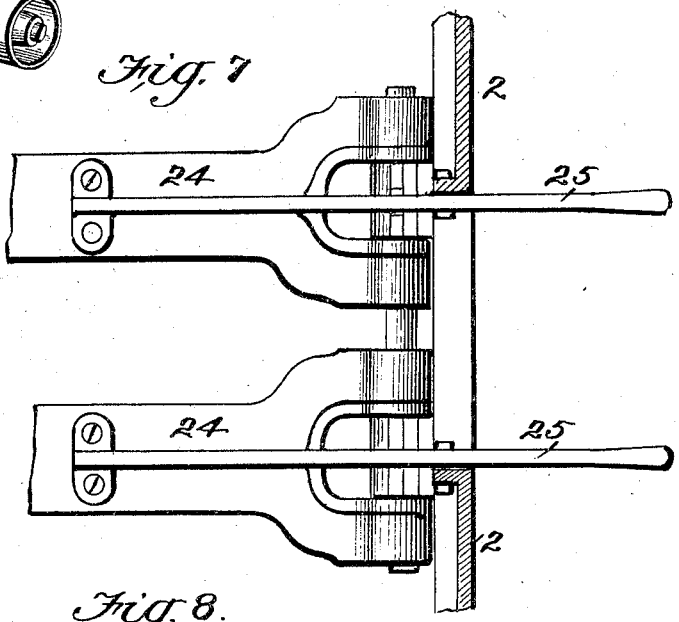
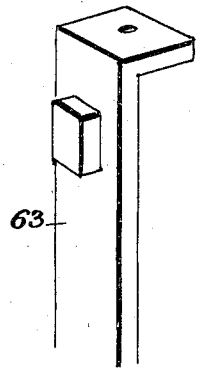
WITNESSES:
Jos. A. Ryan
Amos W Hart
INVENTOR
Olmedo C. Wysong.
BY Munn & co.
ATTORNEYS No. 793,492.

Patented June 27, 1905.

UNITED STATES PATENT OFFICE.

OLMEDO CORTEZ WYSONG, OF GREENSBORO, NORTH CAROLINA.

MORTISING-MACHINE.

SPECIFICATION forming part of Letters Patent No. 793,492, dated June 27, 1905.

Application filed June 18, 1904. Serial No. 213,117.

*To all whom it may concern:*

Be it known that I, OLMEDO CORTEZ WYSONG, a citizen of the United States, and a resident of Greensboro, in the county of Guilford and State of North Carolina, have made certain new and useful Improvements in Mortising-Machines, of which the following is a specification.

My invention is an improvement in power-driven mortising-machines. I employ a series of augers and hollow chisels arranged horizontally and mounted in frames or holders which are adjusted toward and from each other on the horizontal top of the main frame. The stuff or work to be mortised is fed regularly and automatically to the augers and chisels, it being supported upon a bed or carriage which is reciprocated automatically and regularly and provided with a "fence," or work-support, adapted for adjustment to accommodate work of different thicknesses or for mortises of different depths. The said bed or carriage is supported upon brackets which are adapted to be raised and lowered by screws, according to the thickness of the stuff or work or the location of the mortises therein. The power is applied by means of a treadle.

The invention is embodied in the construction, arrangement, and combination of parts hereinafter described and claimed, the same being illustrated in the accompanying drawings, in which—

Figure 1:
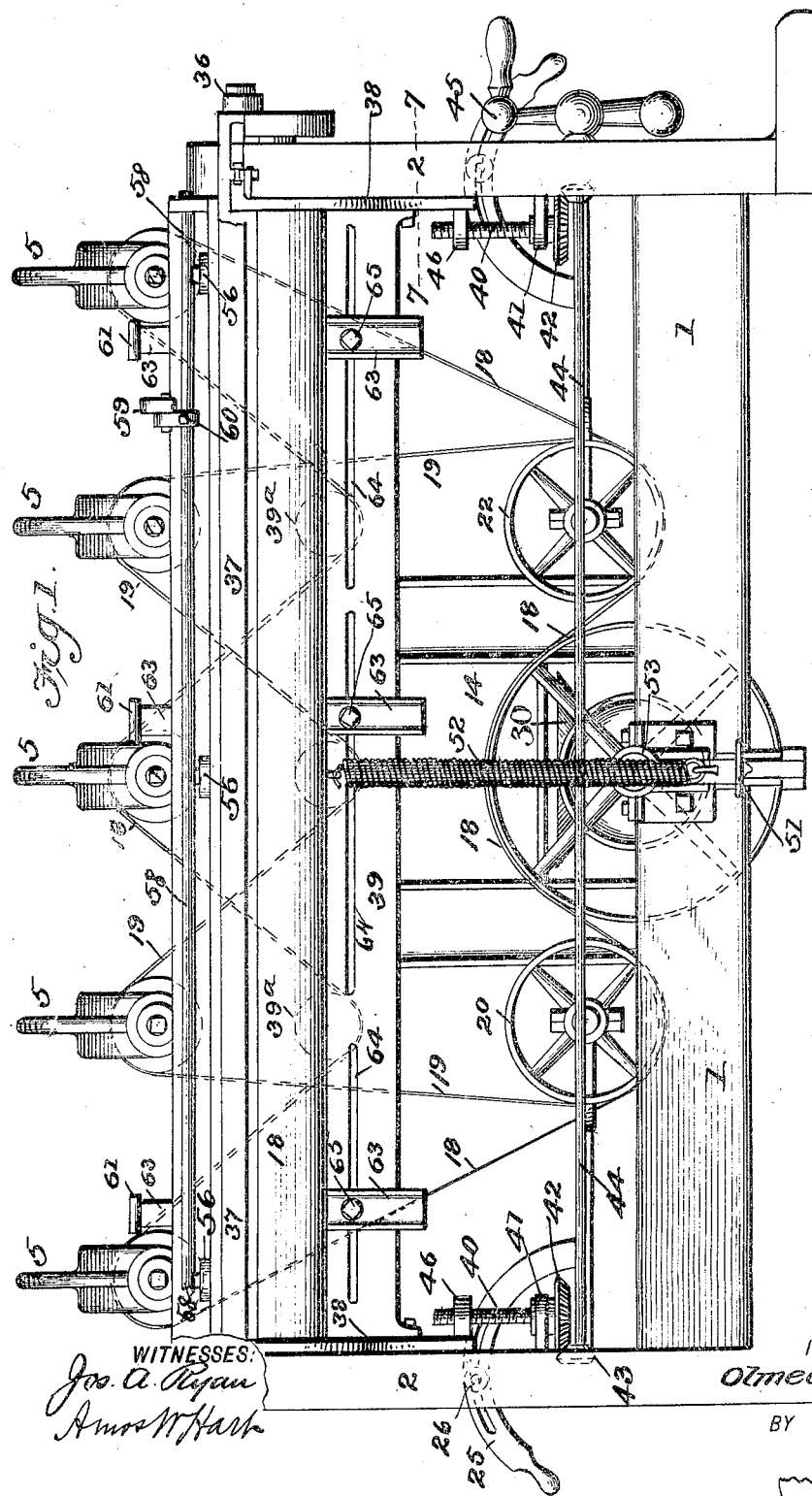
Figure 2:
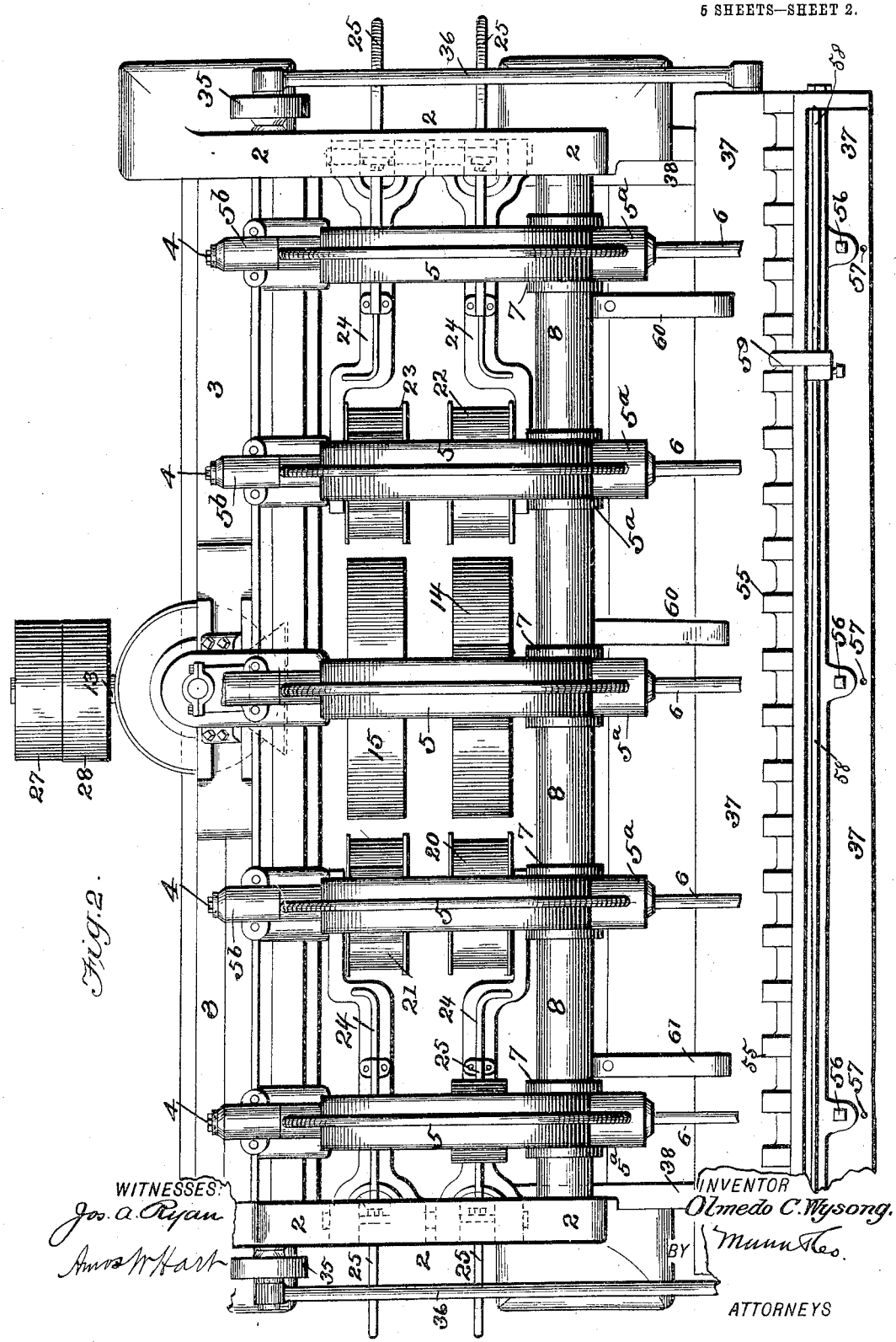
Figure 4:
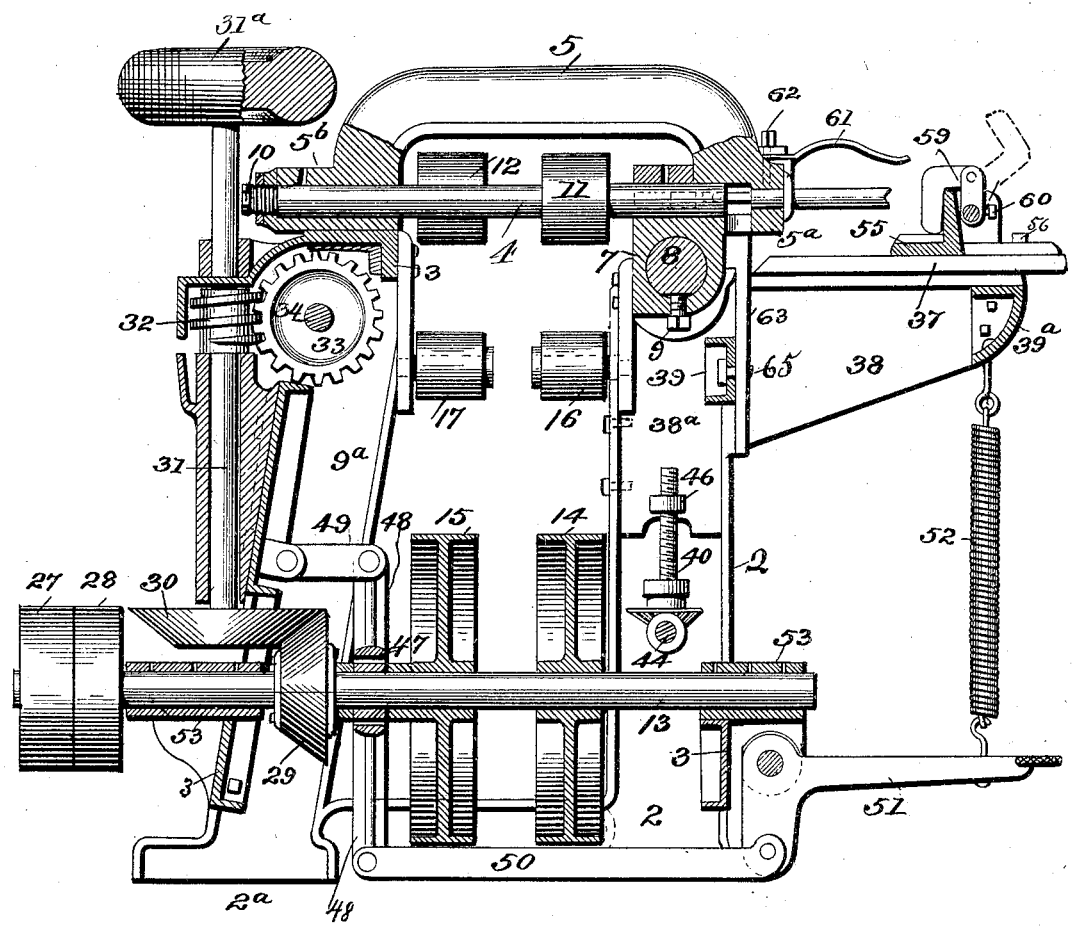
Figure 5:
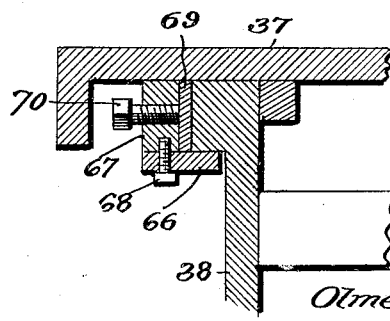

Figure 1 is a front elevation of my improved machine. Fig. 2 is a plan view of the same. Fig. 3 is an end view. Fig. $3^a$ is a detail section. Fig. 4 is a central vertical cross-section. Fig. 5 is an enlarged detail vertical section illustrating the connection between the sliding bed or carriage and the brackets upon which it rests. Fig. 6 is a perspective view of one of the holders or frames for the augers and chisels. Fig. 7 is a horizontal section on the line 7 7 of Fig. 1. Fig. 8 is a perspective view of one of the bars to which a spring work-holder is attached.

As illustrated in Figs. 1 to 4, the frame of the machine is composed of foundation pieces or girders 1, vertical posts or standards 2 $2^a$, and connecting-girders 3. As shown best in Fig. 4, the shafts 4, carrying and rotating the augers, are arranged horizontally and have their bearings in holders or frames 5, (see Fig. 6,) which have the following peculiarities of construction: The central portion is arched and T-shaped in cross-section and is provided at its ends with an integral bearing $5^a$ $5^b$ for the shafts 4. The bearing $5^a$ is provided with a socket for reception of the square hollow chisel 6, and the auger rotates within this in a well-understood manner. The part $5^a$ is also formed integrally with a cylinder 7, arranged at right angles to and beneath the same. I preferably employ five of such holders or frames, as will be seen by inspection of Fig. 2. The bearings 7 receive a horizontal girder 8, which is mainly cylindrical, the same being arranged at the top of the front posts 2 and supported in castings forming a part of the latter. The frames 5 are held in position on the girder 8 by means of clamp-screws 9. In other words, the frames 5 are supported at their rear ends $5^b$ upon one of the top girders 3 and are adapted for adjustment laterally toward and from each other and are clamped in any required adjustment by means of the screws 9. Thus the chisels and augers may be set at any required distance apart by the simple adjustment of the frames on the girders 3 and 8. Since but one bearing 7 embraces a girder 8, it will be seen that the frames 5, with their boring shafts and devices, may be more easily applied and removed when required than is practicable in machines whose corresponding frames embrace two parallel girders or supports, and to facilitate such application and removal of the frames the girder 8 is itself made slidable endwise, and thus detachable from its supports or bearings in the main frame of the machine. The shafts 4, carrying the augers, are not threaded on their ends; but they run against a brass plug 10, which is threaded and on which is a jam-nut. (See Fig. 4.)

As illustrated best in Fig. 1, the several auger-shafts 4 are driven by belt-gearing. As shown in Fig. 4, the shafts 4 are provided with pulleys 11 12, or, in other words, the pulleys are arranged in different positions on adjoining shafts. Thus on the first shaft the pulley 11 is placed near the front bearing $5^a$, and on the adjoining shaft the pulley 12 is placed nearer the rear bearing 5ᵇ. Thus every other shaft is provided with a pulley located nearer the front than the pulleys 12 of the alternating shafts. On the driving-shaft 13 are arranged two large driving-pulleys 14 and 15. The two idlers 16 and 17 (see Fig. 4) are arranged above them in corresponding position. A belt 18 runs on all the pulleys 11, 14, and 16, and another belt 19 runs on all the pulleys 12, 15, and 17. Thus all the shafts 4 are driven at the same speed and simultaneously in the same direction, but by different means. On each side of the driving-pulleys 14 and 15 are arranged large idler-wheels 20 21 and 22 23. (See especially Fig. 2.) As there shown, each of the idlers is journaled at the free end of an oscillating bar or frame 24, the same being hinged in the end posts 2 of the main frame. As shown in Fig. 1, these bars or frames 24 are provided with arc-shaped levers or handles 25, which are slotted longitudinally to receive a clamp-screw 26, by which the idlers may be held locked in any position to which they may be adjusted. In practice it is not always necessary to thus lock all the idlers. It may suffice to lock two of the same and to allow the other two to play freely up and down, or the free ones may be provided with additional weights, so that they will automatically take up the slack of the respective belts, and thus allow more freedom of action. The fixed idlers 16 and 17 are carried on studs attached to a bracket or arm extending down from the yoke, (see Figs. 4 and 6,) thus making the idlers self-adjusting with the yoke, which also carries the chisel and auger-mandrel. The said brackets or arms alternate in position on adjacent yokes, one yoke having the arm at one end and the adjacent yoke at the opposite end. As before stated, the frames 5, carrying the augers, may be adjusted horizontally along the girders 3 and 8, and thus brought nearer to or separated farther from each other, according to the required distances between the mortises. When such adjustment is made, the idlers 20 21 and 22 23, being held unlocked and free to fall or rise, the slack of the belts 18 19 is immediately taken up in case the frames 5 are adjusted toward each other, or the belts are, so to speak, "paid out" or "extended" in case the frames 5 are adjusted farther apart. In other words, the belts, through the medium of the idlers, instantly accommodate themselves in respect to tension to any change in position of the frames 5.

The driving-shaft 13, (see Fig. 4,) is provided with a driving-pulley 27 and an idler 28. It is further provided with a friction bevel-gear 29, which is adapted to engage a similar gear 30, keyed upon the vertical shaft 31. The latter is provided with a worm 32, which engages a worm-wheel 33, keyed upon a horizontal shaft 34. The latter projects at the ends of the main frame, as will be seen by reference to Fig. 2, and is provided at that point with cranks or eccentrics 35, which are connected by rods 36 with a sliding bed or carriage 37, upon which the work is supported and duly held. It is obvious that the rotation of the shaft 34 will cause horizontal reciprocation of the bed or carriage 37, and thus the work will be alternately moved toward and from the augers and chisels. As shown best in Figs. 3 and 4, the said bed or carriage is supported and adapted to slide horizontally upon brackets 38, and the latter are adapted for vertical adjustment on the front posts 2. To this end the said brackets are provided with vertical portions 38ᵃ, (see Fig. 4,) which are adapted to fit in the hollow posts 2 and slide vertically therein. The brackets are connected by a horizontal girder 39. The means for adjusting the brackets and the carriage 37, supported thereon, so as to raise or lower the work relative to the augers and chisels, are screw-shafts 40, one being arranged at each end of the main frame, as shown in Fig. 1. These shafts have enlarged heads working in suitable bearings 41, which project from the posts 2, and below the same the shafts are provided with bevel-gears 42, which mesh with bevel-pinions 43, keyed upon a horizontal shaft 44, that extends nearly the whole length of the main frame. One end of said shaft 44 is provided with a crank 45, by which it may be rotated as required. The threaded shanks of the shafts 40 work in lugs 46, formed integral with bracket members 38ᵃ. It will thus be apparent that by rotating the shaft 44 the brackets 38 may be raised and lowered, and with it the carriage and work-support. Thus the work may be adjusted vertically to the augers and chisels according to the distance at which the mortises are required to be from the lower edge of the work.

As before stated, the bed or carriage 37, with the work-support thereon, is reciprocated horizontally on the brackets 38 through the medium of the shafts 31 34 and their connecting worm-gear. The friction-gears 29 and 30 of the driving-shaft 13 and vertical shaft 31 are held normally out of engagement, as shown in Fig. 3, but may be brought into engagement, as shown in Fig. 4. The means for effecting this are as follows: The gear 29 is keyed upon the driving-shaft 13. The latter is provided adjacently with a sleeve 47, to which a vertical lever 48 is applied, the same being pivotally connected by a link 49 (see Fig. 4) with a lug on one of the rear posts 2ᵃ. The lower end of the said lever 48 is connected by a bar 50 with the shorter arm of an elbow treadle-lever 51, which is journaled on one of the horizontal girders 3. Its free end is connected by a spiral spring 52 with one of the brackets supporting the reciprocating work-carriage. (See also Fig. 3.) Normally the tension of this spring suffices to hold the lever 51 elevated, as shown in Fig. 3, sufficiently to hold the bevel-gear 29 out of frictional engagement with the gear 30; but when the operator places his foot on the treadle 51 and depresses it it brings friction-gears 29 and 30 in engagement, thus rotating worm 32 and worm-gear 33 so that the table carrying the stock moves toward and from the augers. In this operation the driving-shaft 13, with its attached pulleys, is shifted bodily longitudinally in its bearings 53, (see Fig. 4,) which are attachments of the lower horizontal girders 3. Thus the position of the work relative to the augers and chisels and the feeding of the same to the latter are entirely under the control of the operator. In other words, the driving-shaft 13, being made slidable in its bearings, when the treadle 51 is depressed it will shift the shaft longitudinally through the medium of connecting-bar 50, lever 48, and link 49, (see Figs. 3 and 4,) so as to bring its bevel-gear 29 in contact with gear 30 on the vertical worm-shaft 31, connected with horizontal shaft 34, whereby the latter is rotated and the work table or carriage 37 is reciprocated (through medium of eccentrics 35 and rods 36, Figs. 2 and 3) for the purpose of bringing the stock or work up to the augers and removing it therefrom.

The vertical shaft 31 is extended (see Fig. 4) to near the top of the machine and provided with a hand and balance wheel $31^a$—that is to say, this wheel serves as a means for moving the table 37 manually to and from the augers and chisels when adjustments are required to be made during the time when the gears 29 30 of driving-shaft 13 and vertical shaft 31 are out of engagement, and it also serves as a balance-wheel when the machine is running, since it renders it more difficult to check the rotation of the vertical shaft 31 when the work and chisels come in contact, or, in other words, causes the table to advance more steadily or with less reduction of speed at the moment when the augers and chisels and work meet.

I will now further describe the attachment of the brackets 38, the bed or carriage thereon, and the parts which coact with the latter.

As shown in Fig. $3^a$, each bracket 38 has lateral projections $38^b$, which work in vertical guideways provided in the front posts 2, and wear may be taken up by screws 54. As shown in Figs. 2, 3, 4, the fence or work-support 55 is arranged longitudinally of the bed or carriage 37 and is adapted for adjustment toward and from the augers and chisels by means of bolts 56, (see Fig. 2,) which pass through lugs formed on the rear side of the same and adapted to enter holes 57, formed in the carriage 37. The work-support consists of a horizontal portion, which is cut out, and thus formed with a series of blocks, as shown in Fig. 2, and a vertical portion or shoulder, as shown in Fig. 4. In rear of such vertical portion is arranged a horizontal shaft 58, the same being supported at its ends in brackets forming rear extensions of the work-support, as shown. Upon this shaft is adapted to slide a work-stop 59, the same consisting of two parts, one of which is secured upon the shaft in any desired adjustment by means of a clamp-screw 60 and the other being pivoted thereto and made in right-angular form, so that it is adapted to drop over the vertical portion of the work-support, in which position it will engage and stop the work when slid along the work-support lengthwise thereof. It is apparent that the stop 59 is thus adapted to be adjusted at any desired point to accommodate stuff or work of different lengths and that its hinged portion may be thrown up and backward out of the way, as illustrated by dotted lines, Fig. 4, when it is desired to push the work along or off the support 55.

Another important feature of my invention is the provision of an automatic spring clamp and holder for the work. As shown in several figures, the same consists of a plate-spring 61, which is arranged substantially horizontal, its forward or free end being curved slightly upward and its rear end being secured by a clamp-screw 62 upon the horizontal head of a vertical bar 63. (See Figs. 1, 4, 8.) The several bars 63 are supported upon the horizontal girder 39, which connects the brackets 38 and is provided with horizontal slots 64 (see Fig. 1) to accommodate the clamp-screws 65, by which said bars are secured. Thus the spring-clamps 61 may be adjusted along the girder 39 whenever required—as, for example, when the frames 5, carrying the auger-shafts, are adjusted horizontally toward and from each other. It will be apparent that when the bed or carriage 37 is moved toward the augers and chisels 6 the upwardly-curved free ends of the spring-clamp 61 will strike upon the edge of the work or stuff and ride over the same, as illustrated in Fig. 4, so that the springs will bear down upon the work and hold it securely during the time that the augers and chisels are operating thereon.

As shown in Fig. 5, the bed or carriage 37 is held slidably on the brackets 38 by plates 66 and 67, which are secured together by screws 68, the plate 66 underlying a shoulder of the bracket, as shown. Between said shoulder and the plate 67 is interposed a wear-plate 69, which may be adjusted by a screw 70. The outer ends of the brackets 38 are rigidly connected by a horizontal girder $39^a$.

What I claim is—

1. In a mortising-machine, the combination, with a main frame and boring devices proper arranged thereon, of a work-support, and means for supporting the same vertically, and means for reciprocating it horizontally, a work-holder comprising a spring which is fixed in position and adapted to ride upon the work and apply elastic pressure thereto during the mortising operation, substantially as described.

2. In a mortising-machine, the combination, with the main frame and mortising devices arranged thereon, of a work-support, and means for supporting and operating the same, a spring-presser which is fixed in position and adapted to ride upon the work as it advances and apply elastic pressure thereto during the mortising operation, and a vertically-adjustable support for such presser, and means for securing the same in any adjustment, substantially as described.

3. In a mortising-machine, the combination, with the main frame and mortising devices arranged thereon, of a work-support, brackets upon which the work-support is adapted to reciprocate, means for vertically adjusting said brackets, a spring work-holder adapted to ride on the work, and vertical bars to which such work-holders are secured, the bars being connected with the brackets and thus adapted for vertical adjustment with the work-support, substantially as described.

4. In a mortising-machine, the combination, with a suitable frame, mortising devices proper, mechanism for operating them, and a driving-shaft, of a work-support, a rotary horizontal shaft, and means operatively connecting it with said work-support for reciprocating the latter in the required manner, a vertical shaft geared with both said horizontal shaft and driving-shaft, its extended upper portion being provided with a heavy-rimmed wheel which serves for use in manual adjustments and in regulating the operation of the machine in the manner described.

5. In a mortising device, the combination, with a suitable frame, a boring device, a driving-shaft which is slidable longitudinally, and means connecting such shaft with the boring device, of a work-support and a suitable guide upon which it rests and is adapted to reciprocate, means for reciprocating the work-support and for operatively connecting it with the driving-shaft, a treadle, and mechanism connecting it with the driving-shaft for sliding the latter into operative engagement with the said means for actuating the boring device, and a spring which normally supports the treadle-lever for operating in the manner shown and described.

6. In a mortising-machine, the combination, with a suitable main frame having the top girder 8 which is held removably in the front portion of the frame and parallel to said portion, of a series of independent frames carrying mortising-tools, the frames being provided with a front bearing adapted to embrace and slide laterally upon and also on and off such removable girder, and clamp-screws for securing the said frames in any adjustment on the girder, substantially as described.

7. In a mortising-machine, the combination, with the main frame, a fixed horizontal girder and a parallel girder held removably in said frame, of a series of movable frames for carrying boring mechanism, which have at one end a bearing that embraces the removable girder and at the other a bearing that rests upon but is unattached to the fixed girder as shown and described for the purpose specified.

8. In a mortising-machine, the combination, of a main frame, the series of independent frames 5 adapted for lateral adjustment on the main frame, horizontal boring-shafts journaled in front and rear bearings in the frames and provided with a pulley intermediate of said bearings, the pulleys in adjacent frames being arranged at different distances from the front bearings of the frames 5, driving-pulleys, vertically-swinging idlers, and fixed idlers arranged in a plane intermediate said driving-pulleys and the pulleys carried by the frames 5, and belts arranged to run on the several pulleys as described.

9. In a mortising-machine, the combination, with the main frame, a driving-shaft and two driving-pulleys keyed thereon, of two sets of idlers arranged on opposite sides of said pulleys, the idlers proper being journaled in swinging frames which are provided with means for locking them in any required adjustment, a series of independent frames and boring-shafts carried thereby, the latter having band-pulleys arranged alternately in front and rear and the frames themselves together with the shafts being adjustable laterally along the top portion of the main frame, a double series of fixed idlers arranged between the said frames and the movable idlers, and two belts arranged on the several pulleys and adapted to drive the alternate boring-shafts, substantially as described.

OLMEDO CORTEZ WYSONG.

Witnesses:
GAITHER F. OAKLEY,
CLABORN F. MOON.